Aug. 25, 1953 P. C. MANGAN ET AL 2,649,905
SELECTIVE FUEL CONTROL FOR TURBOJET POWER PLANTS
Filed March 10, 1950
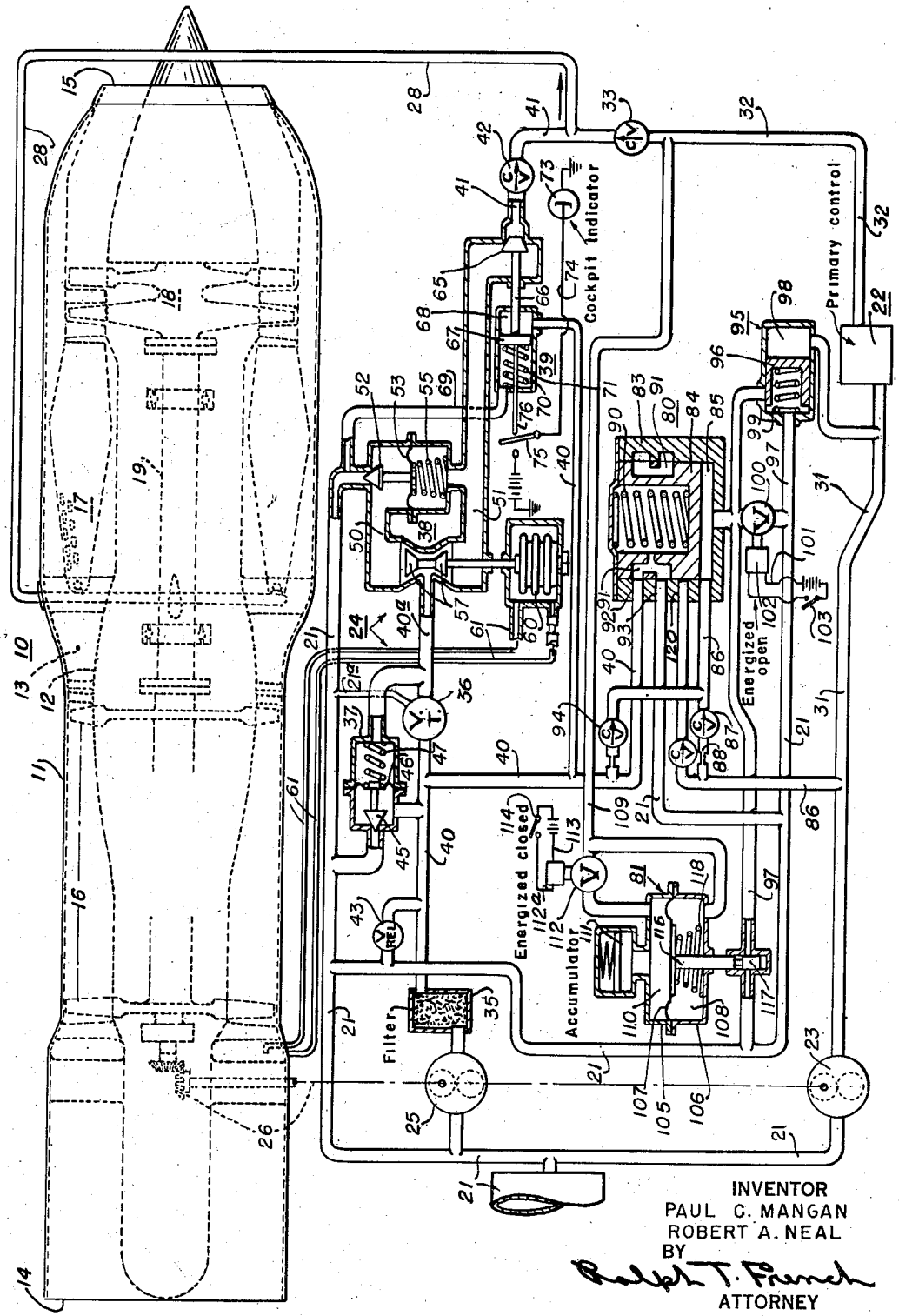
INVENTOR
PAUL C. MANGAN
ROBERT A. NEAL
BY
*Ralph T. French*
ATTORNEY Patented Aug. 25, 1953

2,649,905

UNITED STATES PATENT OFFICE 2,649,905

SELECTIVE FUEL CONTROL FOR TURBOJET POWER PLANTS

Paul C. Mangan, Ridley Park, and Robert A. Neal, Media, Pa., assignors to Westinghouse Electric Corporation, East Pittsburgh, Pa., a corporation of Pennsylvania Application March 10, 1950, Serial No. 148,844

4 Claims. (Cl. 158—36.3)

This invention relates to fluid fuel control apparatus, and more particularly to an aviation fuel system having selective primary and emergency control.

It has been proposed to equip a high-speed aircraft power plant, such as a gas turbine engine having critical fuel requirements, with alternatively operative primary and stand-by or emergency fuel control means, for minimizing the dangerous consequences of sudden failure of the fuel supply during flight operation. Preferably, such a dual fuel control includes primary and emergency pumps and is provided with means automatically operative to effect quick change-over from primary fuel control to emergency fuel control in the event of failure of the primary pump or other elements associated therewith. It is an object of the present invention to provide improved fuel control apparatus of this type, which is selectively operative to render the emergency fuel control quickly available under various flight operational conditions.

Another object of the invention is the provision of improved change-over or selector means for the dual fuel system of an aircraft power plant, wherein a selected operative pressure incident to normal operation of the primary fuel control portion, during a take-off operation for example, is rendered the determinative or measure of subsequent performance thereof, so that a sudden reduction in efficiency of the primary system will be immediately detected to facilitate automatic change-over to the emergency fuel control.

A further object of the invention is to provide improved aircraft fuel control selector means for effecting change-over from primary fuel control to emergency fuel control, which can be rendered quickly operative either automatically, as in response to failure of the primary control to maintain a predetermined performance level, or manually at the will of the pilot.

These and other objects are effected by the invention as will be apparent from the following description and claims taken in connection with the accompanying drawings, forming a part of this application, in which the single figure is a diagrammatic view of a dual fuel supply system for a power plant of the gas turbine type, including emergency control and selector means therefor constructed in accordance with the invention.

In the drawing, a gas turbine engine 10 is provided, comprising a generally cylindrical casing 11 having axially mounted therein a sectional core structure 12 forming an annular fluid flow passageway 13, which extends longitudinally through the engine from a forwardly-directed air intake opening 14 to a rearwardly disposed jet discharge nozzle 15. The operating components of the engine are arranged along the axis thereof and include an axial flow compressor 16, annular combustion apparatus 17 and a turbine 18, the rotor of which is operatively connected to the rotor of the compressor by a shaft 19. In operation, with the engine disposed in an aircraft so that the air intake 14 is pointed in the line of flight, air entering the intake opening is compressed by the compressor 16 and passes through the passage 13 to the combustion apparatus 17 for supporting combustion of fuel, which is supplied thereto in a manner hereinafter explained. The resultant hot motive fluid is then expanded through the turbine 18 and discharged to atmosphere through the nozzle 15 in the form of a jet establishing a propulsive thrust.

For supplying fuel under suitable pressure to the combustion apparatus of the engine 10 there is provided a dual fuel control system, comprising a low pressure source of liquid fuel such as a tank and pipe system generally indicated at 21, primary fuel control apparatus 22 having a primary pump 23, and stand-by or emergency fuel control apparatus generally indicated at 24 and having an emergency pump 25. Both pumps 23 and 25 are operatively connected through the medium of suitable shaft and gear mechanism 26 to the rotor of the engine compressor 16, and are thus adapted to be driven simultaneously by the engine. Either the primary or the emergency fuel control apparatus 22 and 24 may be conditioned to control the metering of fuel to the engine combustion apparatus 17 through a pipe 28, the emergency control apparatus 24 being normally rendered inoperative, however, until failure or loss of efficiency of the primary control apparatus 22 renders necessary a change-over to fuel metering by the emergency control apparatus, as hereinafter more fully explained.

To simplify the present disclosure of the invention, the primary fuel control apparatus 22 is illustrated only in diagrammatic form without details other than the primary pump 23. It will be understood that suitable features of construction and operation may be embodied in the primary fuel control, such as means responsive to throttle position and engine speed for governing the flow of fuel to the combustion apparatus in accordance with operating conditions. By way of example, one suitable type of primary control is disclosed in the application of Cyrus F. Wood, Serial No. 121,171, filed October 13, 1949, which has been assigned to the assignee of the present application. It will here suffice to point out that the primary pump 23 has an inlet connected to the tank or low pressure fuel source 21 and a discharge outlet communication 31 leading to the primary fuel control apparatus 22, the fuel discharge or metering communication 32 of which is connected to the pipe 28 leading to the combustion apparatus 17. A check valve 33 is preferably interposed in the metering communication 32 for preventing back flow from the pipe 28.

The emergency fuel control apparatus 24 may be of any suitable construction operable to effect metering of fuel to the engine under sufficient control to enable uninterrupted operation thereof when the primary fuel control fails or is cut out of operation. In association with the emergency pump 25, the emergency control apparatus 24, as illustrated in the drawing, may comprise a filter 35, a manual throttle valve device 36, a differential relief valve 37, a barometric relief valve device 38 and a shut-down valve device 39, which are interposed in series relation in a pump discharge communication generally indicated at 40 and 40a, through which fuel discharged from the emergency pump 25 flows to the pipe 28 by way of a discharge communication 41 containing a check valve 42. An excess-pressure responsive relief valve device 43 of conventional design may be provided for by-passing fuel from the pump discharge communication 40 to the low pressure source or pipe 21 in the possible event of building up of a fuel pressure high enough to jeopardize the operating elements of the fuel system.

The differential relief valve device 37 comprises casing structure containing a valve element 45 controlling another by-pass communication from the pump discharge communication 40 to the low pressure pipe 21. The valve element 45 is actuated by a diaphragm 46 subject to opposing pressures of fuel at the inlet and discharge sides of the throttle valve device 36. A spring 47 is provided for biasing the valve element 45 toward closed position, in opposition to pressure of fuel on the upstream side of the throttle valve device 36. In operation, the differential relief valve device 37 is adapted to by-pass fuel under pressure from the pump discharge pipe 40a to the low pressure pipe 21 in sufficient quantity to maintain a constant pressure drop across the throttle valve device 36, regardless of variations in fuel flow under different operating conditions. The throttle valve device 36 is preferably operative to control communication from the pump discharge 40 to either the communication 40a, or when shut off, to a branch 21a of the low pressure or inlet communication 21.

The barometric relief valve device 38 is arranged to control the flow of fuel conducted through the communication 40a from the manual throttle valve device 36 in such a manner as to maintain a fixed pressure relationship under varying conditions of altitude, flight speed and ambient temperature. The device 38 comprises casing structure having a valve chamber 50 adapted to communicate with the pump discharge communication 40a, and an outlet chamber 51 which is interposed between the pump discharge communication 40a and communication 41. A relief valve element 52 is mounted on one end of the valve chamber 50 for controlling communication therefrom to the low pressure pipe 21, subject to operation of a diaphragm 53 that is connected thereto and interposed between chambers 50 and 51. A light spring 55 may be associated with the diaphragm 53 for biasing the valve element 52 toward its seat in opposition to fuel pressure in the valve chamber 50. The valve element 52 is operative to maintain a fixed pressure relationship in cooperation with a flow divider valve element 57 having opposed seating portions, which is interposed between the connected portions of chambers 50 and 51 and actuated by a partially evacuated bellows diaphragm 60, subject to compressor inlet total and static air pressure admitted through a pair of conduits 61, for dividing the flow of fuel under pressure from the manual throttle valve device 36 to the respective chambers 50 and 51 in accordance with changes in ambient pressure to maintain the engine rotational speed constant relative to throttle setting.

The shut-down valve device 39 serves to cut off all flow of fuel from the emergency control apparatus to the engine when the throttle is set in the shut-down position, or when the emergency control apparatus is inoperative, and comprises a valve element 65 having a stem 66 connected to a piston 67, which is mounted in casing structure between a chamber 70 communicating through a passage 69 with the low pressure pipe 21, and a chamber 68 communicating with the emergency pump discharge communication 40. A spring 71 disposed in the chamber 70 acts on the piston 67 to urge the valve element 65 toward its seated position. The spring is thus operative to close the shut-down valve device 39 so long as the pressure of fuel in the pump discharge communication 40 is below a predetermined operational value. For indicating to the pilot that the engine is operating on the emergency system when such is the case, an electro-responsive cockpit indicator 73 may be provided, to be energized through a suitable circuit 74 upon operation of a switch 75 by a stem 76 of the piston 67 when the latter is moved by emergency fuel pressure against the force of the spring 71.

It will be understood that the elements of the emergency fuel control apparatus 24, just described, may in practice be constructed and arranged in a unitary casing structure having suitable passages for affording the desired communications.

According to the invention, for selecting operation of either the primary fuel control apparatus 22 or the emergency fuel control apparatus 24, while rendering inoperative whichever apparatus is not to function, there are provided a change-over or selector valve device 80, and a pilot valve device 81 for effecting quick operation thereof in the event of failure of the primary control during a take-off operation of the aircraft.

The selector valve device 80 comprises a casing 83 having a bore in which a piston valve element 84 is slidably mounted, forming on one side a control chamber 85 which communicates with the primary pump discharge communication 31 by way of one branch of a communication 86 including a check valve 87 for preventing backflow to the communication 31. A restricted passage 88 may be provided upstream of the check valve 87 for minimizing surging of pressure in the control chamber 85. Disposed on the opposite side of the piston valve element 84 is a biasing spring 90, which is adapted to urge the valve element toward its emergency position upon predetermined reduction in fuel pressure in the chamber 85, as hereinafter explained. With the piston valve element 84 maintained in its normal position, as shown in the drawing, a cavity 91 therein registers with a port 92 connected to the emergency pump discharge communication 40, and with a port 93, which is connected to the low pressure pipe system 21. For ensuring initial movement of the piston valve element 84 to normal position in opposition to the force of spring 90, when the fuel supply apparatus is started, a branch communication and check valve 94 are provided to conduct fuel from the emergency pump discharge communication 40 through the communication 86 to the control chamber 85, augmenting the output of primary pump 23.

Associated with the selector valve device 80 is a fuel pressure responsive pilot or release valve device 95, comprising a casing having a bore in which a piston valve element 96 is subjected to the force of a spring 99 and adapted for movement thereby for establishing communication from the control chamber 85 to the low pressure pipe 21 by way of a communication 97. The valve element 96 is normally maintained in a closed position, as shown, by the pressure of fuel in a chamber 98 communicating with the primary pump discharge communication 31.

A normally closed electro-responsive release valve device 100 is also interposed between the communications 97 and 21, and is adapted to be actuated to establish communication therebetween upon energization of a circuit 101 including an operating magnet 102, which circuit is preferably controlled manually through the medium of a suitable switch 103.

The pilot valve device 81 comprises casing sections 105 and 106 having clamped therebetween a flexible diaphragm 107, which has formed on one side thereof a spring chamber 108 communicating with a conduit 109 which is at all times in communication with the outlet communication 32 of the primary control apparatus 22.

On the other side of the diaphragm 107 is provided an expansible accumulator chamber 110, which has a bellows diaphragm or yieldable wall 111 (shown diagrammatically) and is connected to the conduit 109 through the medium of a normally open electro-responsive cut-off valve device 112 including an actuating magnet 112a. The latter is adapted to be energized, for cutting off communication between chamber 110 and conduit 109, by means of a suitable circuit 113 controlled by a manual switch 114. A follower and plunger 116, terminating in a valve 117 interposed in communication 97, are mounted in operative connection with the diaphragm 107, which is thus constructed and arranged to respond to a reduction in fluid pressure in spring chamber 108 to move the valve 117 for establishing communication from the control chamber 85 of the selector valve device to the low pressure communication 21. A coil spring 118 is interposed between the follower of the diaphragm 107 and a wall of spring chamber 108 for normally maintaining the valve 117 in its closed position, as shown in the drawing.

To describe operation of the invention it will be assumed that the aircraft equipped with the power plant and fuel system hereinbefore described is about to take off, with the primary pump 23 and control apparatus 22 operated to deliver fuel to the combustion apparatus 17 at a high rate of flow to ensure development of adequate thrust. The pressure of fuel in the primary pump discharge communication 31 and consequently in the control chamber 85 is then high enough to maintain the piston valve element 84 in its normal position as illustrated, while the fuel discharged by the emergency pump 25 is circulated through the communication 40, and through the connected ports 92, 91 and 93 to the low pressure fuel source 21, thus maintaining the emergency control apparatus 24 in an inoperative condition. If the pilot at such time desires the protection of the automatic safety feature provided by the accumulator pilot valve device 81, he will close the switch 114 while the power plant is developing the thrust incident to the take-off operation. With the switch 114 closed, the circuit 113 is energized to effect closure of the cut-off valve device 112, bottling up in the accumulator chamber 110 a quantity of fuel under the high pressure initially developed in preparation for the take-off operation.

In the event of subsequent failure of the primary pump 23 or of the primary fuel control apparatus 22, while the take-off maneuver of the aircraft is being executed, the resultant reduction in fuel metering pressure in conduits 32 and 109 and in chamber 108 will cause quick response of the diaphragm 107 under pressure of the entrapped fuel in chamber 110 to overcome the force of spring 118 for shifting the valve 117 to its open position. With fuel under pressure thus quickly released from the control chamber 85, the spring 90 will be rendered effective to move the piston valve element 84 to emergency position. In this position of the piston valve element, the cavity 91 connects a port 120 to the port 93, thereby causing by-pass flow to the low pressure pipe 21 of any fuel subsequently discharged from the primary pump 23. At the same time, further by-passing of fuel from the emergency pump 25 by way of the selector valve device 80 is cut off, and the emergency fuel control apparatus 24 is thus rendered operative to assume the burden of metering fuel under pressure to the engine 10 in the manner already explained.

After completion of a protected take-off operation of the aircraft under ordinary circumstances which have not involved a failure of the primary fuel control apparatus, the pilot may restore the dual fuel system to normal flight condition by returning the switch 114 to its normal open position.

The pilot may at any time render the emergency fuel control apparatus 24 operative, independently of possible functioning of the automatic pilot valve device 81, by closing switch 103 to effect opening of the release valve device 100. In case of an electrical power failure, the fluid pressure responsive release valve device 95 will ultimately operate in response to predetermined reduction in pressure of fuel from the primary control apparatus 31, incident to failure thereof, to cut the emergency control apparatus 24 into effective operation.

While the invention has been shown in but one form, it will be obvious to those skilled in the art that it is not so limited, but is susceptible of various other changes and modifications without departing from the spirit thereof.

What is claimed is:

1. A control device for initiating automatic change-over from a primary fuel system to an emergency fuel system, comprising means forming a primary fuel supply passage adapted to receive fuel at variable primary system pressure, a biasing spring, a movable control element operable against the force of said spring to effect a change-over operation, a movable abutment operatively connected to said control element, a control chamber communicating with the primary fuel supply passage, an expansible accumulator chamber also communicating with said primary fuel passage, said movable abutment being interposed between said control and accumulator chambers, and a valve for cutting off the communication between said primary fuel passage and said accumulator chamber for bottling up fuel therein at a selected primary system pressure, said movable abutment being thereafter operable by pressure of fuel in said accumulator chamber to operate said control element upon a relative reduction in control chamber pressure indicative of failure of said primary fuel system.

2. In a liquid fuel system for a power plant, in combination, a low pressure fuel source, primary and emergency pumps connected to the fuel source, primary control means having an outlet and normally operative to control the supply of fuel under pressure from said primary pump by way of said outlet, emergency control means having an outlet and operable to control the supply of fuel under pressure thereto from said emergency pump when said primary means is rendered inoperative, a fluid pressure responsive selector valve device having one position for opening a first by-pass communication between the outlet of said primary pump and said fuel source and another position for opening a second by-pass communication between the outlet of said emergency pump and said fuel source, said selector valve device having a control chamber connected to said outlet of said primary pump for subjecting said selector valve device to primary fuel pressure for normally maintaining said selector valve device in the position in which only said second by-pass communication is opened, a normally closed pilot valve interposed in a discharge communication between said control chamber and said low pressure fuel source, and fluid pressure means connected to the outlet of said primary control means for actuating said pilot valve in response to a predetermined reduction in pressure of fuel delivered by said primary control means, whereby said selector valve device is actuated to close the second by-pass communication for rendering said emergency control means thereafter effective to control the supply of fuel from said emergency pump.

3. In a fuel pressure system, a low pressure fuel source, primary control means including a primary pump and having a fuel pressure outlet, said primary control means being operative for normally regulating the supplying of fuel under pressure by said pump to a power plant, emergency control means including an emergency pump and operative for regulating the supplying of fuel in the event of failure of the primary means, a first bypass adapted to connect together the discharge outlet and the inlet of said emergency pump, a second bypass for connecting together the discharge outlet and inlet of said primary pump, a fuel pressure responsive selector valve device operative to open either of said bypasses while closing the other and having a control chamber normally charged at primary pump pressure, said selector valve device normally holding open said first bypass and being operative to close the latter while opening said second bypass upon reduction in primary fuel pressure in said control chamber, and consequently to cut said emergency control means into operation, an accumulator pilot valve device comprising a discharge valve controlling communication between said control chamber and the low pressure fuel source, a fixed volume chamber and an expansible accumulator chamber communicating with the fuel pressure outlet of said primary control means, a movable abutment interposed between said fixed volume and accumulator chambers for actuating said discharge valve, and a cut-off valve interposed in the communication between said fuel pressure outlet and said expansible accumulator chamber, said cut-off valve being operable at will to bottle up said fuel in said accumulator chamber at the pressure attained during a full power output stage of operation of said primary control means, for subsequently effecting operation of said abutment and discharge valve to release fuel from said control chamber, thereby effecting operation of said selector valve device for rendering operative said emergency control means, in the event of failure of said primary control means to maintain substantially the same pressure in said fixed volume chamber as initially provided in said accumulator chamber.

4. Fuel control selector apparatus as set forth in claim 3 having in combination, a normally closed release valve interposed in a communication between the control chamber and the low pressure source in parallel with said communication controlled by the discharge valve of the accumulator pilot valve device, said release valve being manually operable for effecting operation of the selector valve to render the emergency control system operative regardless of the condition of the primary control system.

PAUL C. MANGAN.
ROBERT A. NEAL.

References Cited in the file of this patent

UNITED STATES PATENTS

| Number | Name | Date |
|---|---|---|
| 2,440,371 | Holley | Apr. 27, 1948 |

FOREIGN PATENTS

| Number | Country | Date |
|---|---|---|
| 918,123 | France | Oct. 7, 1946 |